UNITED STATES PATENT OFFICE.

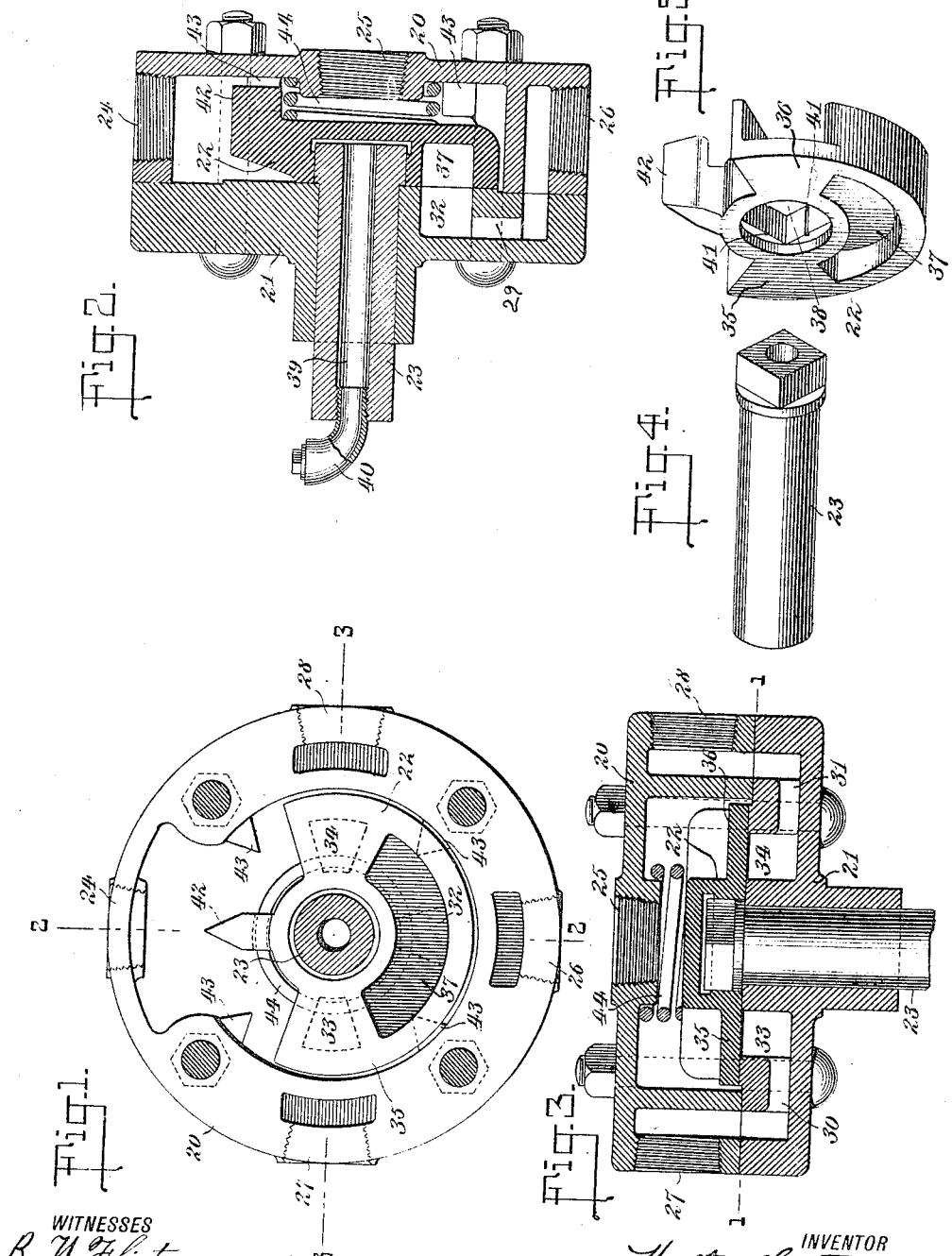

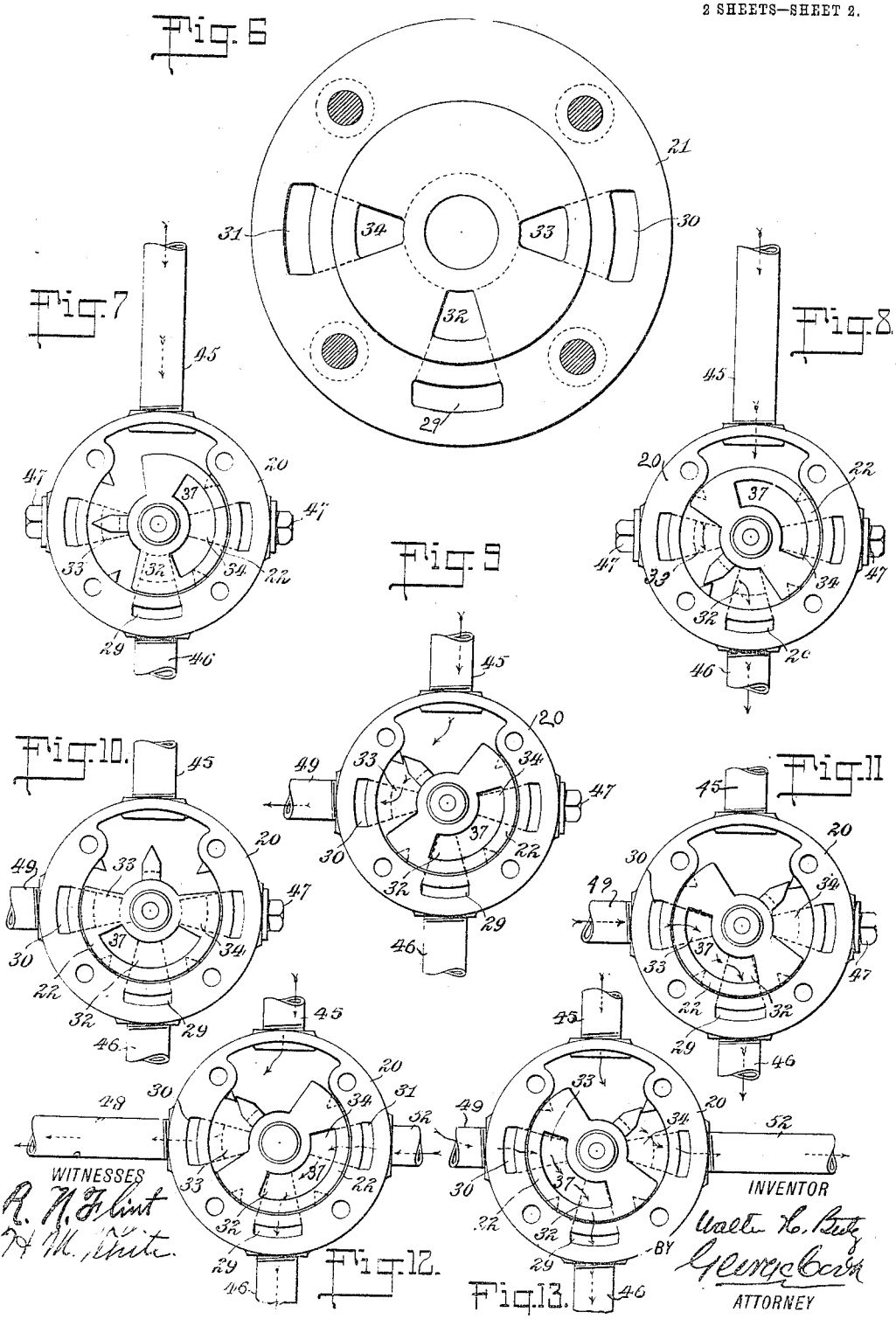

WALTER H. BUTZ, OF NORTH PLAINFIELD, NEW JERSEY, ASSIGNOR TO THE Q M S COMPANY, OF PLAINFIELD. NEW JERSEY, A CORPORATION OF NEW JERSEY.

UNIVERSAL VALVE.

1,036,558.

Specification of Letters Patent. Patented Aug. 27, 1912.

Application filed July 3, 1911. Serial No. 636,645.

*To all whom it may concern:*

Be it known that I, WALTER H. BUTZ, a citizen of the United States, and a resident of North Plainfield, in the county of Somerset and State of New Jersey, have made and invented certain new and useful Improvements in Universal Valves, of which the following is a specification.

My invention relates to valves for controlling the flow of a fluid under pressure, such as compressed air, and has for its principal object to provide a valve which may be used as a two-way, three-way or four-way valve, and used also in other ways, all as will be hereinafter explained.

Further and subordinate objects of my invention are to provide various other improvements in and relating to the structure and to particular features of such valves, all as illustrated in the accompanying drawing, described in the following specification, and particularly claimed in the concluding claims.

In the accompanying drawings wherein the preferred embodiment of my invention is illustrated: Figure 1 is a view showing the body portion or casing of my improved valve with the valve disk in place therein, as seen from a plane indicated by the line 1—1, Fig. 3, looking up, the cover and operating spindle being removed; Fig. 2 is a view showing a section of the entire valve upon a plane indicated by the line 2—2, Fig. 1; Fig. 3 is a similar view upon a plane indicated by the line 3—3, Fig. 1; Fig. 4 is a view showing the operating spindle for the valve disk in perspective; Fig. 5 is a view showing the valve disk of my improved valve in perspective; Fig. 6 is a view showing the cover of my improved valve as seen from a plane indicated by the line 1—1, Fig. 3, looking down; Figs. 7 and 8 are views in the nature of diagrams illustrating the use of my improved valve as a two-way valve; Figs. 9, 10 and 11 are similar views illustrating the use of my improved valve as a three-way valve; and, Figs. 12 and 13 are views illustrating the use of my improved valve as a four-way valve.

In the drawings the reference numeral 20 designates the casing or body of my improved valve, 21 represents the cover thereof, 22 is an oscillating valve disk resting upon said cover and 23 is an operating spindle for said valve disk the same being supported by a bearing formed in the cover 21 as shown in Figs. 2 and 3. The cover and body portion are held together by bolts or equivalent fastening means, so that the cover may be readily removed for the purpose of varying the position of the valve disk relative to the ports which it controls, to thereby adapt and arrange the valve for the particular use to which it is to be put, as will hereinafter appear. The fact that the valve seat is upon the cover provides for a convenient re-grinding thereof, the cover being removable without disturbing any pipe connections as all pipes leading to and from the valve connect with openings in the body portion or casing, and communicate with the ports in the cover by means of passages formed in the casing and cover as next appears.

The body portion or casing 20 is provided with a plurality of openings as shown at 24, 25, 26, 27 and 28 designed to receive two or more pipes through which the fluid, the flow of which is to be controlled may flow; the number of pipes, and their location and arrangement, being determined as will hereinafter appear by the particular use to which the valve is to be put. Such openings as do not have pipes connected with them when the valve is arranged for a given predetermined purpose are closed by plugs as will hereinafter appear. The openings 24 and 25 lead directly into the space inclosed by the valve casing and cover, and the flow of fluid through them is not directly controlled by the valve 22, while the other openings communicate with ports which are opened and closed by said valve to thereby control the flow of fluid through them as next appears.

The cover 21 is provided with three passages 29, 30, and 31 which communicate respectively with the openings 26, 27 and 28 in the valve body, and which passages terminate in ports 32, 33 and 34, which ports are controlled by the valve disk 22, whereby the flow of fluid through said ports and passages may be controlled by said valve.

The valve disk 22 is provided with diametrically opposite flat bearing surfaces 35, 36 which move in contact with the inner surface of the cover 21 and which when over either of the ports 32, 33, 34 interrupt the flow of fluid from the interior of the valve casing therethrough, and with a segmental passage 37 cut off from the interior of the valve casing or body but through which a flow of fluid may occur from either of the ports 32, 33, 34 to and through another of said ports in the various conditions under which the valve may be used.

Oscillatory motion is transmitted to the valve disk 22 through the operating spindle 23, the inner end thereof being made square as shown and said squared portion fitting into a recess 38 of like form provided in the said valve disk. The end of the spindle fits somewhat loosely in the recess 38 so that the valve may bear uniformly throughout the entire area of its seat even though the axis of the spindle be not precisely at right angles to the valve seat. The spindle 23 is operated by any suitable operating means connected with the outer end thereof, such, for instance, as by an arm or lever; no operating means, however, is shown, as the same obviously forms no part of the invention to which this application relates.

The operating spindle 23 is provided with a longitudinally extending passage 39 which may be filled with oil or other lubricant through a plugged fitting 40 at the outer end thereof to thereby provide for lubricating the seat of the valve disk 22. The oil or other lubricant within the passage 39, will, as the valve is used, work around the squared inner end of the said spindle and outward between the valve disk and its seat thereby lubricating the same; and it is obviously impossible for the lubricant to escape from the passage 39 without passing between the valve and its seat. The side walls of the recess 38 are preferably provided with grooves 41 to facilitate the flow of oil.

The valve disk 22 is provided with a projecting arm 42, and the valve casing or body 20 is provided with a series of projecting stops or lugs 43 uniformly spaced about the casing, and between any two successive stops of said series of stops the arm 42 may play, said lugs thus forming stops for limiting the extent of movement of the valve disk as will be best understood from the diagrammatic views Figs. 7 to 13. The valve disk is pressed against its seat upon the cover 21 by means of a spring 44 acting between the same and the inner surface of the valve body 20.

The principal of the various uses to which my improved valve may be put are illustrated in the diagrammatic views Figs. 7 to 13. These figures show the valve body or casing 20 and the valve disk 22 therein, the cover 21 being removed. The positions of the ports 32, 33 and 34 are indicated in dotted lines to facilitate the understanding of the operation of the valve, these ports being actually located as hereinbefore explained, in the cover.

Figs. 7 and 8 show my valve arranged as a two-way valve for controlling the flow of fluid through the pipes 45, 46 leading to and from the valve casing 20. The pipe 45 is shown as extending into the opening 24, although it might as well be connected at the opening 25, so as to discharge into the valve casing. The valve disk 22 is so placed that one of the surfaces 35 will cover some one of the ports 32, 33, 34 when the arm 42 thereof is midway between two of the stopping lugs 43, which port will be the one controlled by the valve and with which the pipe leading from the valve will be made to communicate. In Figs. 7 and 8 the port 32 is the one controlled, and, when the valve disk is so moved as to uncover said port, as shown in Fig. 8, fluid will flow through said port and the passage 29 and pipe 46. Obviously either of the ports 33 or 34 could be controlled in the same way, and, in all cases, all openings except those into which the pipes 45, 46 lead are closed by threaded plugs 47 as shown.

Figs. 9, 10 and 11 show the use of my device as a three-way valve to control the flow of fluid through the inlet pipe 45 and pipe 49 to any given device, and from that device through the pipes 49, 46. The valve disk is so placed as that the flat portions 35, 36 cover the ports 33, 34 when the valve is in its middle position. Movement of the valve in either direction will uncover the port 33 or 34 according to the direction of motion, and movement in a reverse direction will connect the port in question with the port 32 through the segmental passage 37 in the valve. As shown in these figures the port 33 and passage 30 are used to connect with the pipe 49, the opening communicating with the port 34 being plugged.

Figs. 12 and 13 show my valve used as a four way valve to control the flow of fluid from the inlet pipe 45 through either of the pipes 49, 52 to two devices; and from those devices through the pipes 49, 52 and 46. The arrangement of the valve is the same as in Figs. 9 to 11, both the ports 33, 34, however, being utilized. When the valve is moved into the position shown in Fig. 12, fluid flows through the pipe 45, port 33, passage 30, and pipe 49; and through the pipe 52, passage 31, port 34, segmental passage 37 in the valve, port 32, passage 29 and pipe 46. When the valve is moved into the position shown in Fig. 13, the fluid flows from the pipe 45 to and through the pipe 52; and from the pipe 49 to and through the pipe 46, the manner in which the ports and passages within the valve register being obvious from the above description.

It will be understood that pipe 45 might be connected with the opening 25 if desired; in which case the opening 24 will be closed by a plug like the plug 47.

Having thus described my invention and explained the operation thereof, I claim and desire to secure by Letters Patent:

1. In a device of the class described, a valve casing having a permanently open supply passage through which fluid is supplied thereto; a plurality of ports opening into passages leading from said casing; a valve within said casing adapted to control the flow of fluid therethrough; means for operating said valve; and means whereby said valve may be adapted prior to its operation to control the flow of fluid through a part only of the ports and passages leading from said casing.

2. In a device of the class described, a valve casing having an opening through which fluid is supplied thereto; a cover for said casing, the same having a plurality of ports opening into passages leading from said casing; an oscillating valve within said casing and resting upon said cover, and the position of which relative to said ports may be varied to thereby control the flow through a part only or through all of said ports and passages; and means for operating said valve.

3. In a device of the class described, a valve casing having an opening through which fluid is supplied thereto and a plurality of other openings through which fluid may flow from said casing; a cover for said casing, the same having a plurality of ports opening into passages formed in said cover and which communicate with the second mentioned openings in said valve casing; a valve within said casing and resting upon said cover and adapted to control the flow through said ports and passages; and means for operating said valve.

4. In a device of the class described, a valve casing having an opening through which fluid is supplied thereto and a plurality of other openings through which fluid may flow from said casing; a cover for said casing, the same having a plurality of ports opening into passages formed in said cover and which communicate with the second mentioned openings in said valve casing; an oscillating valve within said casing and resting upon said cover and the position of which relative to said ports may be varied to thereby control the flow through a part only or through all of said ports and passages; and means for operating said valve.

5. In a device of the class described, a valve casing having an opening through which fluid is supplied thereto; a plurality of ports opening into passages leading from said casing; a series of stops within said casing; an oscillating valve for controlling the flow through a part only or through all of said ports and passages, said valve having an arm adapted to be positioned within the casing prior to its operation so that the arm may play between any two successive stops of said series of stops; and means for operating said valve.

6. In a device of the class described, a valve casing having an opening through which fluid is supplied thereto; a cover for said casing, the same having a plurality of ports opening into passages formed in said cover, and through which ports and passages fluid may flow from said casing; an oscillating valve within said casing and resting upon said cover and adapted to control the flow through said ports and passages; a bearing formed in said cover; and a valve operating spindle supported in said bearing and the inner end of which is in operative engagement with said valve.

7. In a device of the class described, a valve casing having an opening through which fluid is supplied thereto and a plurality of other openings through which fluid may flow from said casing; a cover for said casing, the same having a plurality of ports opening into passages formed in said cover and which communicate with the second mentioned openings in said valve casing; an oscillating valve within said casing and resting upon said cover and adapted to control the flow through said ports and passages; a bearing formed in said cover; and a valve operating spindle supported in said bearing and the inner end of which is in operative engagement with said valve.

Signed at New York, borough of Manhattan, in the county of New York, and State of New York, this 29th day of June, A. D. 1911.

WALTER H. BUTZ.

Witnesses:
R. N. FLINT,
MARY B. JUSTICE.